United States Patent

Kenton et al.

Patent Number: 5,822,614
Date of Patent: Oct. 13, 1998

[54] SELF-IDENTIFYING PERIPHERAL DEVICE

[75] Inventors: Kenneth A. Kenton, Wilmington, Del.; Richard A. Coffman, Jr., Phoenixville, Pa.; Edward A. Miller, Telford, Pa.; Michael Saunders, Norristown, Pa.; Jeffery A. Stell, Exton, Pa.

[73] Assignee: Unisys Corporation, Blue Bell, Pa.

[21] Appl. No.: 655,806

[22] Filed: May 31, 1996

[51] Int. Cl.⁶ .............................. G06F 9/00; G06F 13/10; G06F 13/12

[52] U.S. Cl. .......................... 395/828; 395/282; 395/652; 395/882

[58] Field of Search ................................ 395/186, 187.01, 395/188.01, 828, 835, 856, 651, 652, 653, 282, 283, 838, 839, 868, 882; 364/286.4, 286.5; 340/825.31, 825.32

[56] References Cited

U.S. PATENT DOCUMENTS

| | | | |
|---|---|---|---|
| 4,589,063 | 5/1986 | Shah et al. | 395/828 |
| 4,736,341 | 4/1988 | Redmond et al. | 395/500 |
| 4,866,601 | 9/1989 | DuLac et al. | 395/438 |
| 4,949,245 | 8/1990 | Martin et al. | 395/850 |
| 5,018,095 | 5/1991 | Nissimov | 395/404 |
| 5,022,077 | 6/1991 | Bealkowski et al. | 380/4 |
| 5,214,695 | 5/1993 | Arnold et al. | 380/4 |
| 5,237,674 | 8/1993 | Mohme et al. | 395/442 |
| 5,237,689 | 8/1993 | Behnke | 395/651 |
| 5,247,633 | 9/1993 | Nissimov et al. | 395/404 |
| 5,257,387 | 10/1993 | Richek et al. | 395/284 |
| 5,307,491 | 4/1994 | Feriozi et al. | 395/681 |
| 5,317,693 | 5/1994 | Cuenod et al. | 395/275 |
| 5,327,549 | 7/1994 | Nissimov et al. | 395/652 |
| 5,410,699 | 4/1995 | Bealkowski et al. | 395/652 |
| 5,430,845 | 7/1995 | Rimmer et al. | 395/275 |
| 5,434,722 | 7/1995 | Bizjak et al. | 360/69 |
| 5,459,867 | 10/1995 | Adams et al. | 395/681 |
| 5,479,612 | 12/1995 | Kenton et al. | 395/186 |
| 5,535,368 | 7/1996 | Ho et al. | 711/170 |
| 5,572,685 | 11/1996 | Fisher et al. | 395/287 |
| 5,634,111 | 5/1997 | Oeda et al. | 395/480 |
| 5,655,148 | 8/1997 | Richman et al. | 395/828 |

OTHER PUBLICATIONS

Anon; "DOS Dynamic device driver"; IBM Technical Disclosure Bulletin, May 1986, v. 28, N.12, p. 5249.

Byan, John; "PCMCIA : Past, Present, & Promise"; Feature Article ISSN; Nov. 1994; pp. 65–72.

Vijayan, Jaikumar; "Peripheral connections: Bus spec to ease use of external devices"; Computerworld, Sep. 25, 1995; v29, N39; pp. 39–40.

Simon, Barry "DeskTape 2.0 puts a tape drive on your desktop."; Computer Shopper, v15, N3; Mar. 1995, p. 501.

Plug and Play System Architecture ©1995 by Mindshare, Inc, /Tom Shanley.

*Primary Examiner*—Dieu-Minh Le
*Attorney, Agent, or Firm*—John B. Sowell; Mark T. Starr; Steven B. Samuels

[57] ABSTRACT

A method and apparatus enables a newly installed peripheral device such as a disk device to be used with a computer system without changing the operating system. The peripheral device is identified as a type which is not recognized by an operating system operating in conjunction with the computer system. A value which identifies at least one logical attribute of said peripheral device is obtained from said peripheral device. A determination is made as to whether the operating system and the peripheral device are compatible based on the logical attribute obtained from the peripheral device. The operating system and the peripheral device communicate if it is determined that the operating system and the peripheral device are compatible (i.e., can operate together).

4 Claims, 8 Drawing Sheets

KEYS FILE 208

| RECORD | LICENSE ID FIELD | FORMATTED CAPACITY FIELD | BLOCK SIZE FIELD | HOST CONNECTION FIELD #1 | HOST CONNECTION FIELD #2 | ... | UNIQUENESS FIELD | QUANTITY FIELD | ... | SECURITY ID FIELD | EXPIRATION DATA FIELD |
|---|---|---|---|---|---|---|---|---|---|---|---|
|   | SID00001 | 00008588125 | 000180 | 00 | 001 | ... | 1234567890 | 000015 | ... | CFCFGG1112345 | 10/15/97 |
|   | SID00002 | 00004475653 | 000180 | 03 | 003 | ... | 0121136710 | 000900 | ... | CFCFGG1112345 | 02/20/97 |
|   | SID00003 | 00011119745 | 000512 | 03 | 003 | ... | 3333444455 | 000005 | ... | CFCFGG1112345 | 12/15/97 |
|   | SID00004 | 00016777215 | 000180 | 00 | 001 | ... | 1111111112 | 001000 | ... | CFCFGG1112345 | 01/10/98 |
|   | SID00005 | 00002328690 | 000512 | 00 | 001 | ... | 2323111555 | 000020 | ... | CFCFGG1112345 | 04/17/98 |
|   | SID00006 | 00085881250 | 000512 | 00 | 001 | ... | 9999998765 | 000095 | ... | CFCFGG1112345 | 03/22/99 |
|   | ... | ... | ... | ... | ... | ... | ... | ... | ... | ... | ... |

*Figure 8*

SELF-IDENTIFYING PERIPHERAL DEVICE

FIELD OF THE INVENTION

The present invention relates to a computer system, and more particularly to a computer system in which new peripheral devices can be readily added. In particular, a computer system is disclosed having an operating system which obtains peripheral device information, such as identification and capacity information from the peripheral device so that the operating system and the peripheral device can communicate.

BACKGROUND OF THE INVENTION

Figure 1:
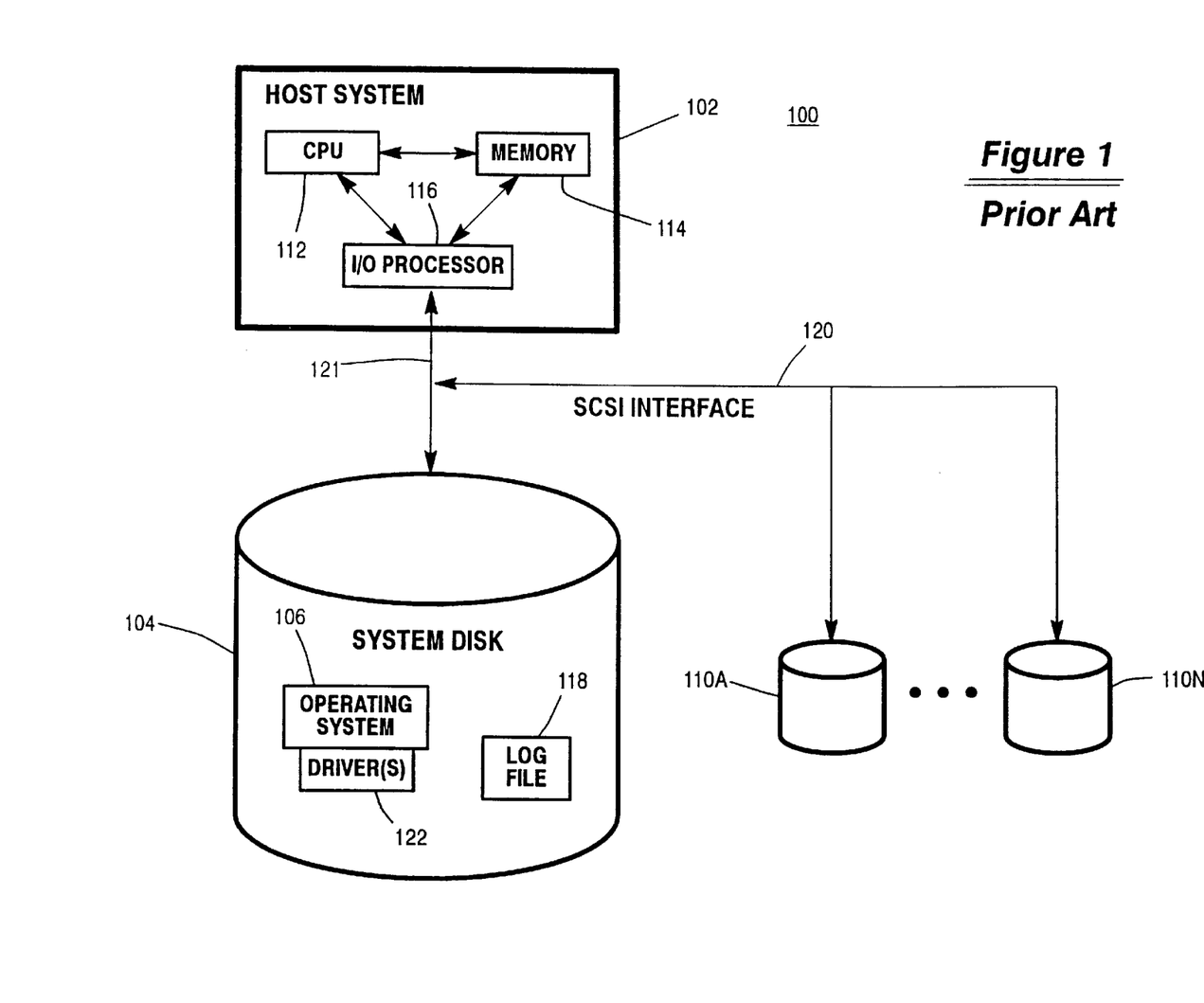
FIG. 1 is a block diagram of a data processing system in accordance with the prior art.

FIG. 1 is block diagram of a computer system 100 in accordance with the prior art. Computer system 100 includes three main units: a host system 102, a system disk 104 and peripheral devices 110A to 110N: (where A–N represents a range of peripheral devices 110 of an arbitrary number). The computer system may be an A Series system developed by Unisys Corporation of Blue Bell, Pa., USA, or it may be any system capable of interfacing with peripheral devices 110.

The host system 102 includes a central processing unit (CPU) 112, memory 114 and an input/output processor (IOP) 116, which are all apparent to those skilled in the art. All communication between the host system 102, the system disk 104 and other devices occurs via the I/O processor 116.

The system disk 104 is connected to the host system 102 via bus 121. The system disk 104 includes an operating system 106. The operating system 106 includes an internal software driver(s) 122 which permits the host system 102 to: (1) identify external peripheral devices 110, (2) issue commands to peripheral devices 110; (3) process exceptions returned by those peripheral devices 110; and (4) command the transfer of data to and from the peripheral devices 110. A log file 118 is also included for storing, for example, system error messages and accessing violation messages. This is useful for diagnostic purposes.

The peripheral devices 110 are connected to the host system via bus 120/121. The peripheral devices 110 may employ Small Computer System Interface (SCSI) as a protocol for communication with the host system 102. Other interface protocols such as Intelligent Peripheral Interface (IPI) and Message Level Interface (MLI) can also be employed by the peripheral devices 110. Peripherals devices 110 may be either disk devices in the mega-to-giga byte range or tape devices, but may also be other devices such as CD-ROM devices.

When a new peripheral device, such as a SCSI disk device, is desired for use with computer system 100, the operating system software (along with other software) often requires modification to include information pertaining to the new peripheral device. Such modifications are desirable so that the operating system can recognize and communicate with the new disk. Such modifications, however, may force customers to upgrade to a new software release level each and every time they wish to make use of a new peripheral device which was not available at the time they obtained their current version of the operating system software. Also, internal testing and development by original equipment manufacturers (OEMs) may be hampered by the need to create a modified internal version of operating system software each time a new peripheral device may need to be investigated and/or tested.

SUMMARY OF THE INVENTION

A method and apparatus enables a newly installed peripheral device to be used with a computer system without changing the operating system. The peripheral device is identified as a type which is not recognized by an operating system operating in conjunction with the computer system. Peripheral device information is obtained from the peripheral device. A determination is made as to whether the operating system and the peripheral device are compatible (i.e. whether they can operate together) based on the information obtained from the peripheral device. The operating system and the peripheral device communicate if it is determined that the operating system and the peripheral device are compatible.

DETAILED DESCRIPTION OF THE PREFERRED EMBODIMENT

The present invention relates to a computer system, and more particularly to a computer system in which new disk drives can be readily added. In particular, computer systems disclosed in which disk drives are readily identified so that they can be subsequently used in conjunction with other computer systems.

Figure 2:
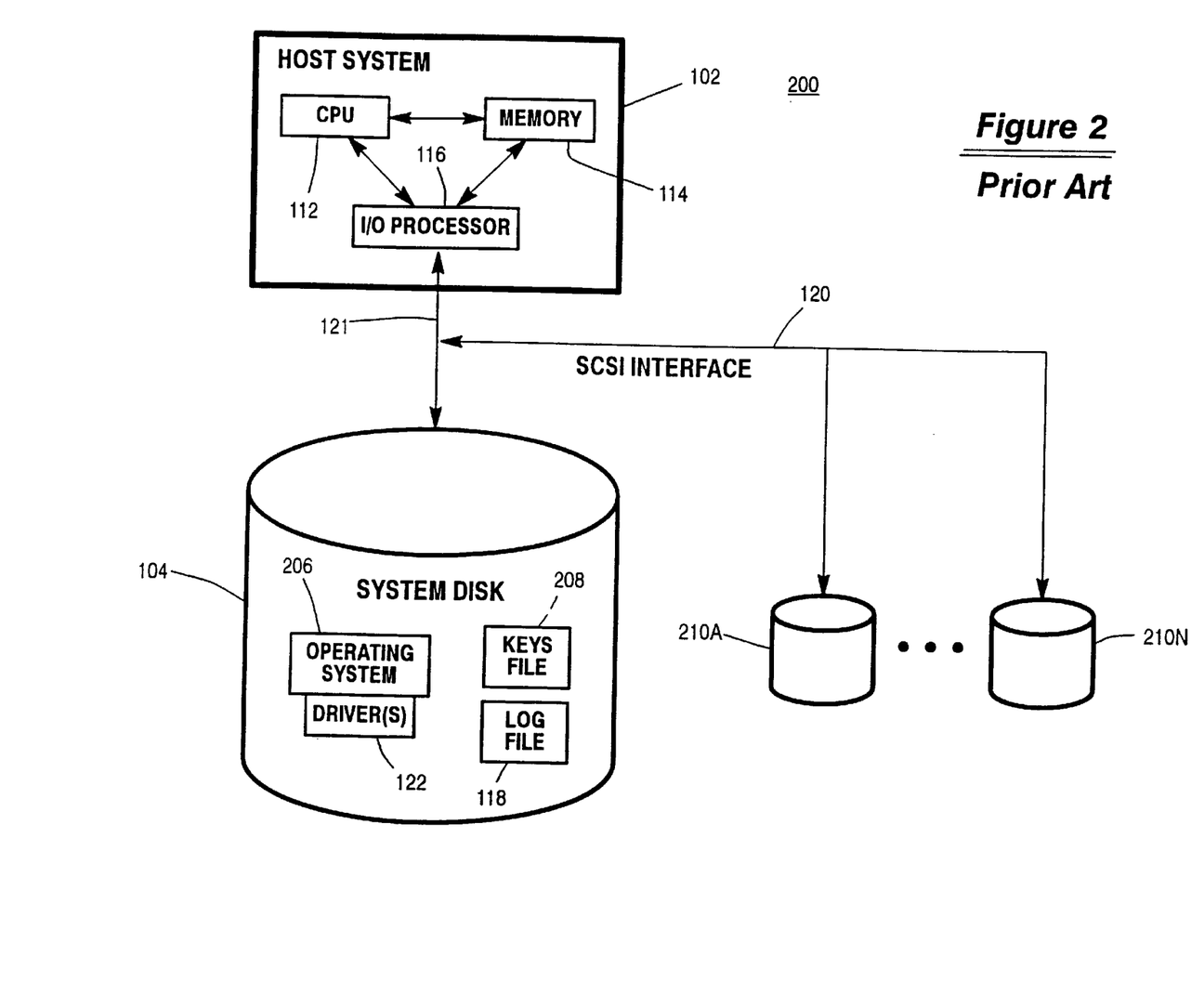
FIG. 2 is a block diagram of the prior art data processing system in which an exemplary embodiment of the present invention is embodied.

FIG. 2 is a block diagram of a computer system 200 according to a preferred embodiment of the present invention. Computer system 200 shares some similarities with computer system 100 illustrated in FIG. 1. Computer system 200, however, differs from computer system 100 in several important aspects.

In particular, in computer system 200, peripheral devices 110A–110N have been replaced, at least in part, with self-identifying peripheral devices 210A–210N. Thus, computer system 200 may include both self-identifying peripheral devices and non-self-identifying peripheral devices. Driver 122 may be the same as in FIG. 1, operating system 106 may be replaced with an enhanced operating system 206 which is capable of operating with self-identifying peripheral devices 210A–210N. Keys file 208 (to be described in more detail below) has been added.

As will be explained in more detail below, self-identifying peripheral devices 210A–210N transmit data over an interface such as SCSI interface 120 (for example) to host system 102 and system disk 104. As previously described, other interfaces such as IPI and MLI may be used. Any (or all) of self-identifying peripheral devices 210A–210N may be replaced with an alternative self-identifying peripheral device 210A1 through 210N1 (not shown) each having a different storage capacity (for example) than the respective peripheral device that they replace. This enables a peripheral device to be replaced by the user without making changes to operating system 206.

In a further exemplary embodiment of the present invention, a system and method are presented for licensing selected embedded peripheral software drivers. These licenses represent the intellectual property associated with the development of the software drivers required for use with the corresponding peripheral devices. By charging separately for the license, the company is able to sell the peripheral devices at a price that is more in line with the competition. It also allows the company to recoup its software driver development costs by charging customers according to their use of the company's software drivers, independent of whether the peripheral devices utilized with those drivers are obtained from a third party vendor or from the company itself.

FIGS. 3 through 6 are flowchart diagrams illustrating operation of exemplary embodiments of the present invention in accordance with the description set forth above.

The description set forth above has referred to the present invention in terms of a peripheral device. Operation of an exemplary embodiment of the present invention will now be described with a disk drive as the peripheral device. It should be understood, however, that any type of peripheral device (e.g., tape) may be used.

Figure 3:
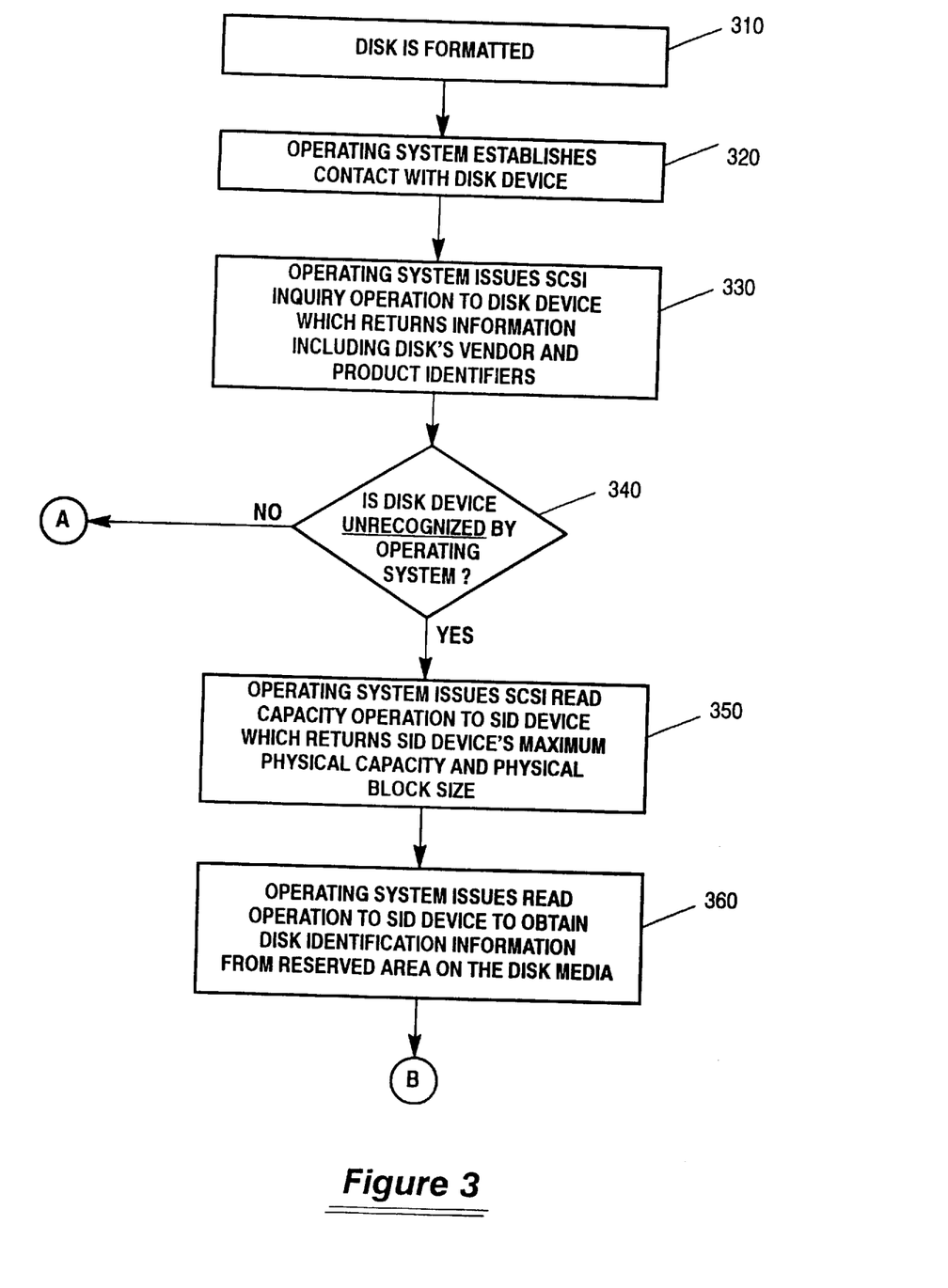
FIG. 3, FIG. 4, FIG. 5 and FIG. 6 are flowchart diagrams which are illustrative of operation of the present invention.

At step 310, a formatting program is executed to format the disk for use. The process of formatting a disk before its initial use is a standard practice in the computer industry and is readily accomplished by one of ordinary skill in the art.

In addition, in accordance with a further exemplary embodiment of the present invention, such a formatting program can be used to place certain pieces of information (hereafter—"disk identification information" or DII) in a reserved area on the disk. DII may include, but is not limited to:

a) disk logical attributes—values which describe logical attributes of the disk. This may be, for example, disk capacity (which is the logical or useable amount of space available on the disk) or number of disk partitions (which is the number of logical partitions into which the physical disk space has been divided);

b) alphanumeric display code—this is a string of alphanumeric values which is used to uniquely identify the specific type of disk to external users. This string is used, for example, to identify the disk in system console displays, system log analysis output, etc.; and c) Original Equipment Manufacturer (OEM) code—this is a predetermined numeric value which is used to uniquely identify the Original Equipment Manufacturer of the disk.

Additional DII may also be written to the reserved area of the disk. For example, a flag may be set to indicate whether the disk operates in a single or a dual port configuration.

It is understood that a disk may be logically removed from use and subsequently reacquired by computer system 200 without necessitating formatting.

At step 320, the operating system establishes contact with the disk device. Establishing contact with the disk device by an operating system is well known in the art.

At step 330, the operating system issues an operation such as a SCSI inquiry operation to the disk device. Such an inquiry operation is also well known in the art. In response to this inquiry, the disk device returns various information to the operating system. Exemplary information which is returned to the operating system may include vendor ID and product ID. The vendor ID and product ID may be used to verify that the disk is self-identifying (i.e., it is not a disk which has been predefined in the operating system software). If the disk has been predefined in the operating system software, control shifts to step 608 in FIG. 6 via off-page connector A. If, however, at step 340, the disk has not been predefined in the operating system software, then control shifts to step 350.

At step 350, the operating system issues an operation such as a SCSI read capacity operation to the self-identifying disk device. In response, the disk device will return to the operating system the disk's block size and number of blocks from which the disk's maximum physical capacity can be calculated. This information is typically maintained via the micro code included with the disk device.

At step 360, the operating system issues a read operation to the self-identifying disk device. In response, the disk drive returns the DII which has been preferably stored on the disk during formatting. Control now shifts to step 410 in FIG. 4 via off-page connector B.

Figure 4:
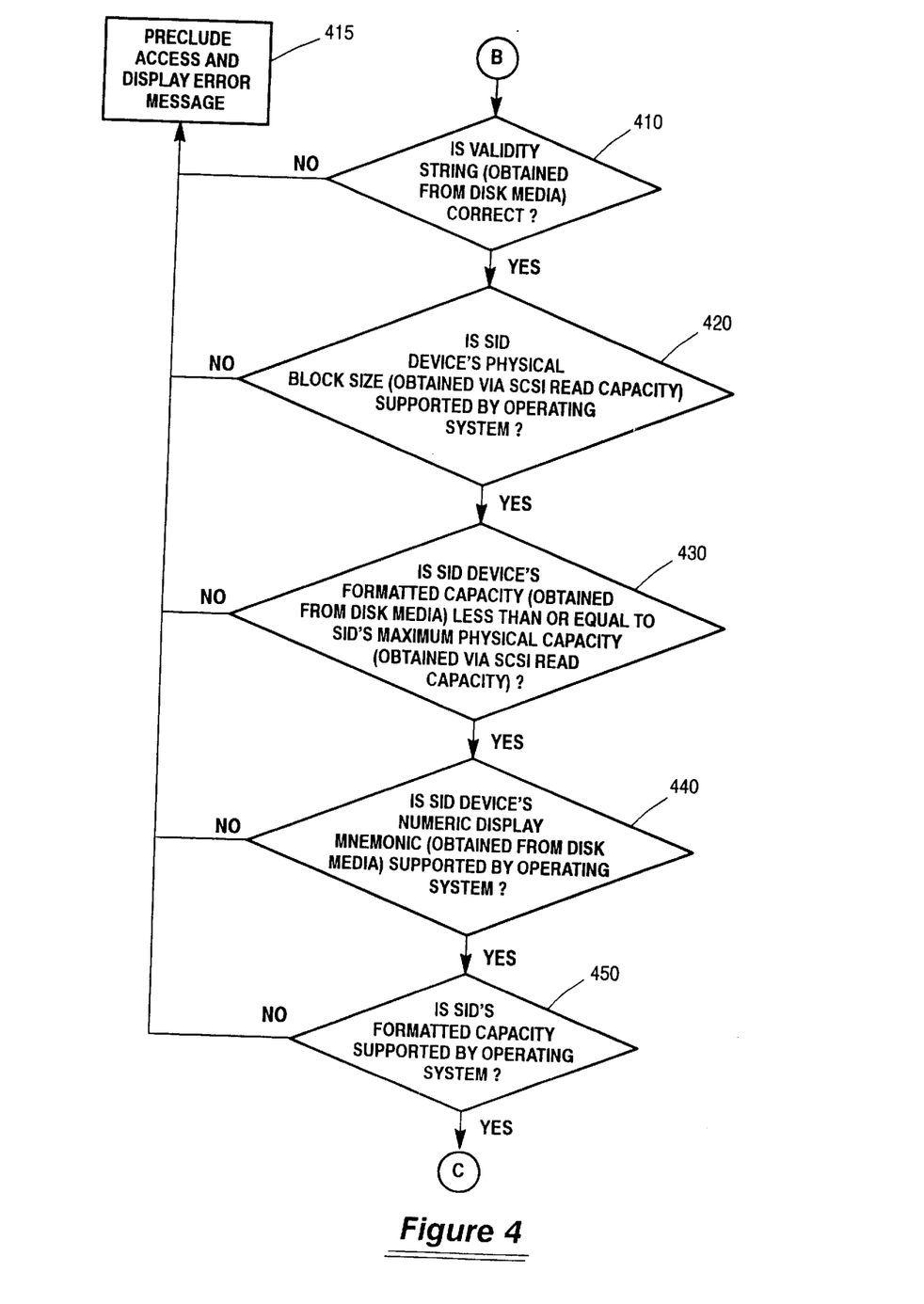

Referring now to FIG. 4, at step 410, the operating system verifies that the disk device has indeed been formatted. In an exemplary embodiment of the present invention, this entails having the operating system check to ensure that a predetermined character string (i.e., a "validity string") has been placed on the disk media during the formatting process.

If the operating system cannot verify that the disk device has been properly formatted, then control shifts to step 415 where access to the disk device is precluded and an error message is displayed. Standard error recovery may then occur. If the operating system determines that the disk device has been properly formatted, then processing proceeds to step 420.

At step 420, the operating system verifies that the self-identifying disk's block size (obtained using the SCSI read capacity command) is supported by the operating system. The operating system may be pre-programmed with a range of block sizes which it supports. Thus, the returned block size may simply be compared with that range.

If the returned block size is not supported by the operating system, then control shifts again to step 415 and standard error handling may occur. Otherwise, if the device's physical block size is supported by the operating system, control shifts to step 430.

At step 430, the operating system compares the self-identifying disk device's formatted capacity (obtained from the DII) with the self-identifying disk device's maximum physical capacity (which was calculated using information returned by the SCSI read capacity command at step 350). If the formatted capacity is not less than or equal to the maximum physical capacity, then again control shifts to step 415 for standard error handling. Otherwise, so control shifts to step 440.

At step 440, the alphanumeric display code which has been returned by the disk device at step 360 is evaluated to determine whether this code indicates a device which is supported by the operating system. Again, the operating system may be preprogrammed with a range of alphanumeric display codes corresponding to the disk devices which it supports. Thus, step 440 may simply involve comparing the alphanumeric display code with the predefined range of data values stored in the operating system.

If the operating system does not support a disk device having the returned alphanumeric display code, then processing may again be transferred to step 415 for error handling. Otherwise, processing proceeds with step 450.

At step 450, the self-identifying disk's formatting capacity (obtained from the DII) is evaluated to determine whether this capacity is supported by the operating system. Once again, this may be accomplished by comparing the returned formatted capacity with a predetermined range of values stored in the operating system. If the formatted capacity is not supported by the operating system, once again, processing may proceed to step 415 for standard error handling. Otherwise, processing may proceed to step 510 in FIG. 5 via off-page connector C.

Figure 5:
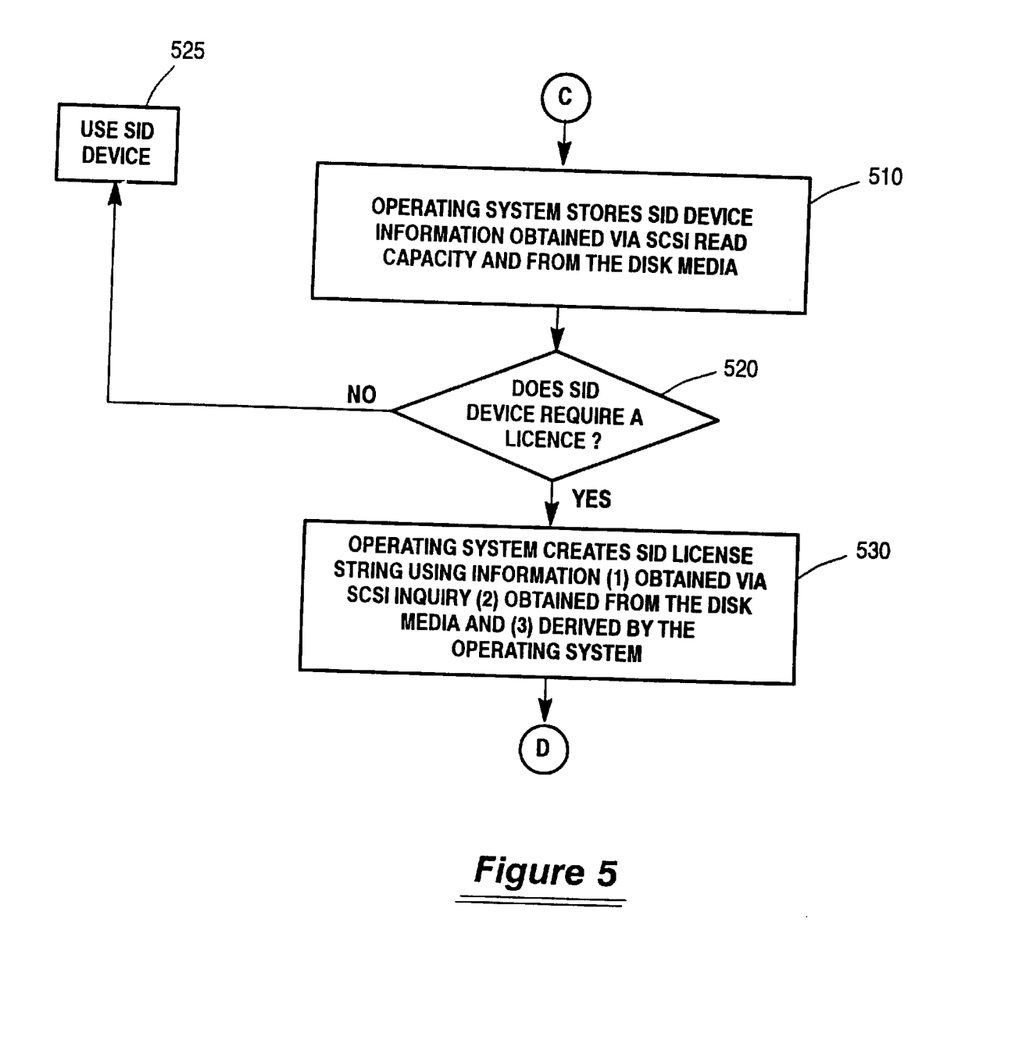

Referring now to FIG. 5, at step 510, entries are now made in the operating system disk identification tables corresponding to the self-identifying disk. These entries include, but are not limited to, disk capacity, block size and alphanumeric display code.

At this point, verification of self-identifying disk status and identity has been completed.

At step 520, the operating system optionally determines whether a license is required to use the self-identifying disk. This may be accomplished, for example, by hard coding the operating system to enforce (or not enforce) licensing for self-identifying disks. If no license is required, then, at step 525, disk initialization is continued as is well known in the art. This may include, for example, reading the disk label, examining the directory structure, determining free and in-use areas on the disk, etc.

Otherwise, at step 530, the operating system builds a self-identifying disk license string using information obtained from the SCSI read capacity command at step 330, using information (e.g., DII) obtained from the disk media and derived from the operating system. Processing then continues at step 612 in FIG. 6 via off-page connector D.

Figure 6:
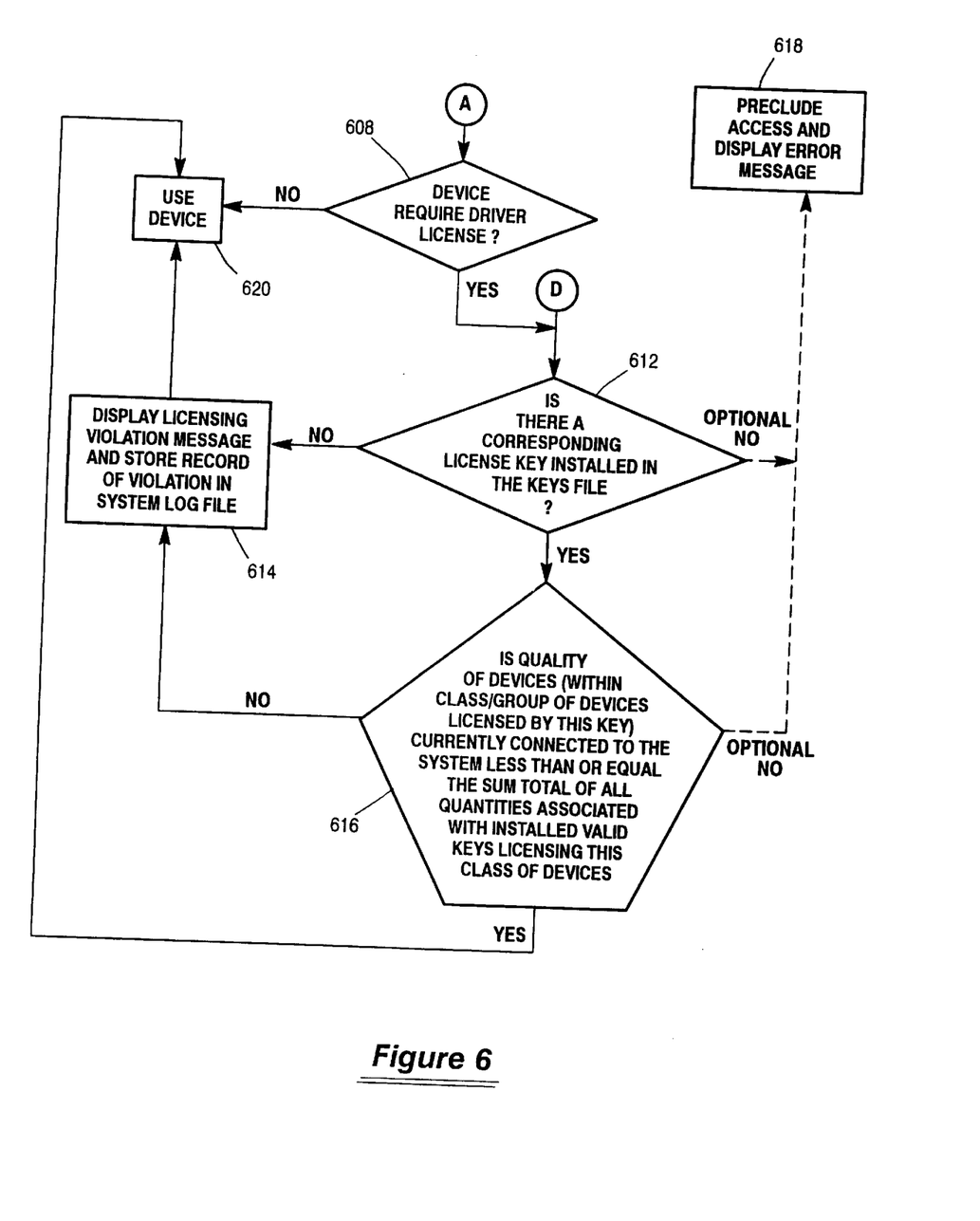

FIG. 6 is a flowchart diagram illustrating the operation of an automated licensing processing/system 600 according to a preferred embodiment of the present invention. Again, this operation is optional. Automated licensing processing/system is described, for example, in U.S. Pat. No. 5,479,612 which is incorporated herein by reference. The operation of the system 600 is described in detail with reference to FIGS. 6 through 8.

Referring to FIG. 6, the licensing processing system 600 includes steps 612–620. Briefly, steps 612–620 represent the process of checking the keys file 208 to confirm that any driver license keys 700 (illustrated in FIG. 7 and described below) which are required for peripheral devices 210 are present. Additionally, steps 612–620 represent methods for encouraging a customer to purchase driver licenses (and thereby obtain the corresponding driver license keys 700 for installation in the keys file 208), for any peripheral devices 210 requiring, but not having, corresponding driver license keys 700 in the keys file 208.

Figure 7:
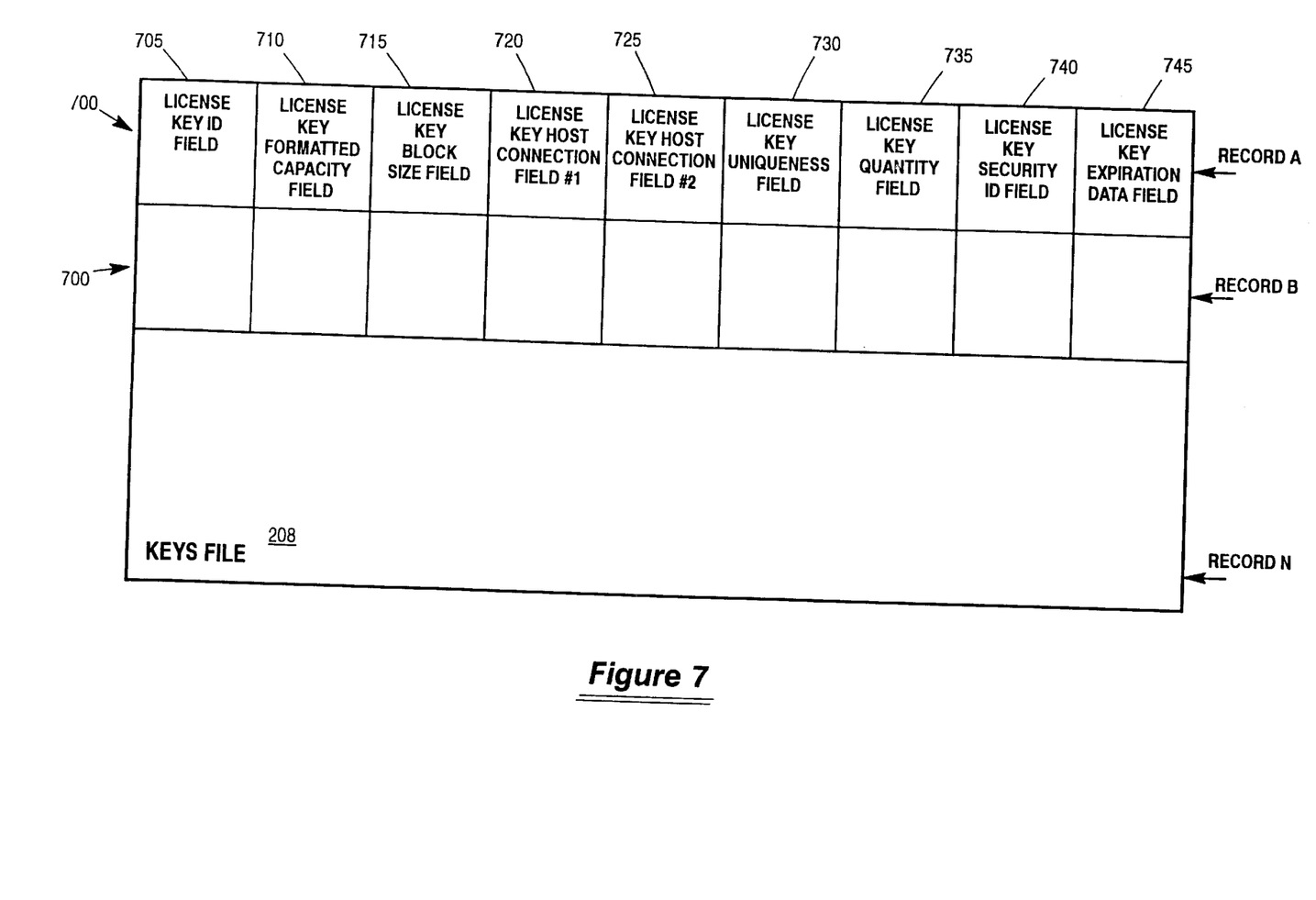
FIG. 7 is a diagram illustrating the file structure of a keys file in accordance with an exemplary embodiment of the present invention.
Figure 8:
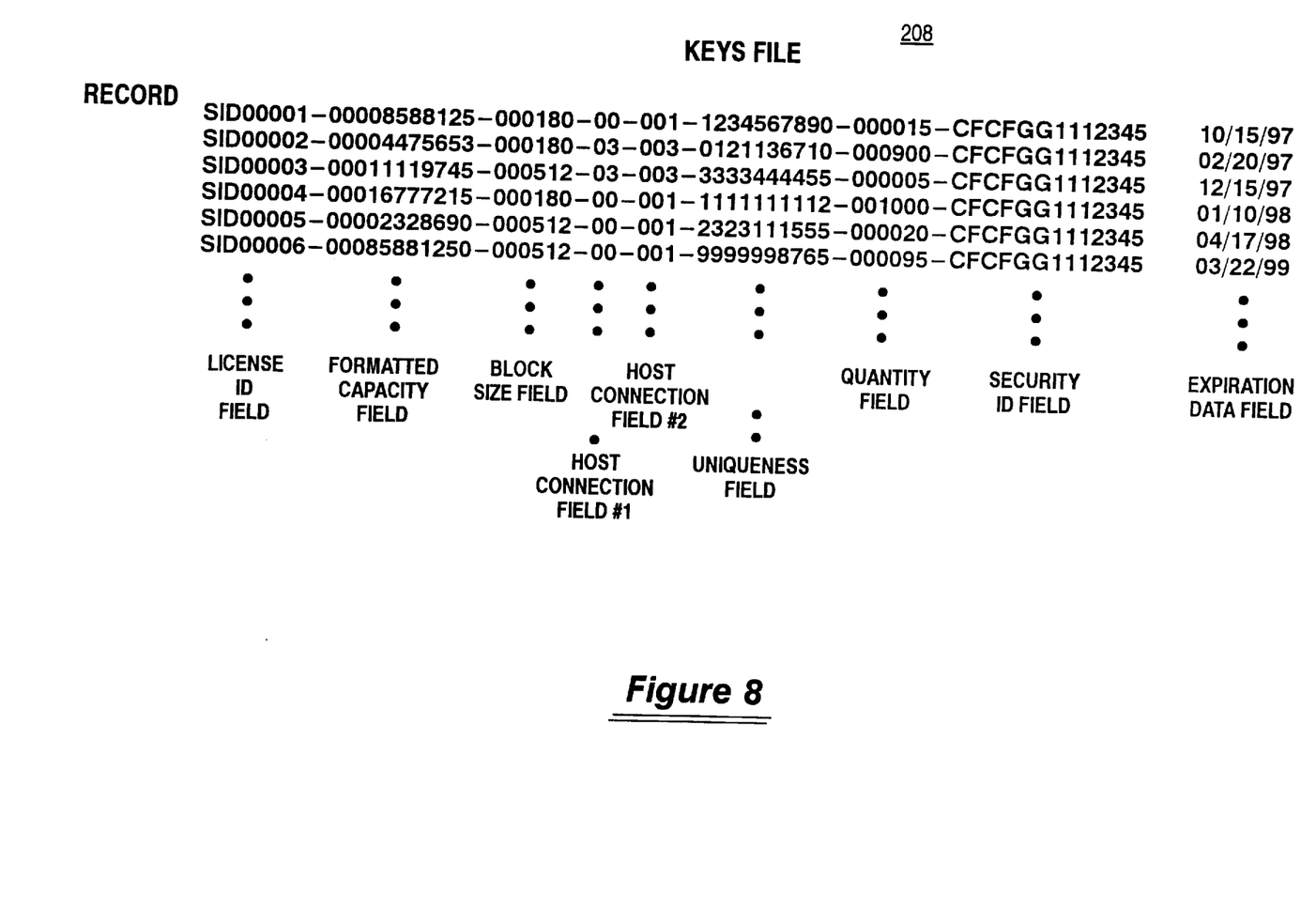
FIG. 8 are exemplary keys files which are useful for explaining operation of the present invention.

A driver license key 700 is a string of EBCDIC characters (for example) divided into relevant fields. The driver license key 700 is stored in the keys file 208. The keys file 208 is shown in more detail in FIGS. 7 and 8. FIG. 7 is a conceptual diagram of the keys file 208 including driver license keys 700 (records A and B). FIG. 8 shows an example of the contents of an actual keys file 208. Referring to FIG. 7, in the preferred embodiment, the driver license key 700 includes nine fields: a license key ID field 705, a license key formatted capacity field 710, a license key block size field 715, a license key host connection field number one 720, a license key host connection field number two 725, a license key uniqueness field 730, a license key quantity field 735, a license key security ID field 740, and an optional license key expiration date field 745. The license key ID field 705 contains license identification information that indicates the class of group of self-identifying disk devices 210 licensed by the key 700 (e.g., SCSI disk devices attached to the system via a SCSI-2 channel). The license key formatted capacity field 710 contains the formatted capacity of the self-identified device licensed by the key. The license key block size field 715 contains the block size of the self-identifying disk device licensed by the key. License key host connection field number one 720 contains a value which is used to make distinctions within a specific type of host connection channel protocol (e.g., SCSI-1, SCSI-2N, SCSI-2W, etc.) within the SCSI channel protocol) used by the device licensed by the key. License key host connection field number two 725 contains a value which is used to indicate the specific type of host connection channel protocol (e.g., MLI, IPI, SCSI, etc.) used by the device licensed by the key. The license key uniqueness field 730 contains a string of characters which is unique for each key and is used to prohibit the manufacture of duplicate driver license keys 700. The license key quantity field 735 contains the quantity of self-identifying peripheral devices 210 licensed by the key. The license key security ID field 740 contains a string of characters (desirably not viewable by the customer) used to prohibit creation of unauthorized driver license keys 700. The optional license key expiration date field 745 contains an expiration date for the license key 700. After this date, the driver license key 700 will be ignored (considered invalid) by the operating system 206.

Thus, when a customer desires access of a self-identifying peripheral device 210 of the type that requires a license, the customer must purchase a software driver license for that peripheral device 210. The corresponding software driver license key 700 is then installed in the keys files 208.

Referring back to FIG. 6, if the self-identifying peripheral device 210 requires a driver license, then the process proceeds to decisional step 612, which determines whether the corresponding license key 700 is installed in the keys file 208. The operating system 206 searches the keys file 208 for a valid key having the license ID field 705 and security ID field 740 corresponding to the class or group of self-identifying peripheral devices 210 which includes the self-identifying peripheral device 210 in question. Furthermore, license key formatted capacity field 710, license key block size field 715, license key host connection field number one 720, and/or license key host connection field number two 725 are all compared with previously obtained data to determine that the device is licensed by the key. If any of the values previously obtained do not correspond to the values stored in license key 700, then the operating system 206 displays a licensing violation message and logs the violation in the log file 118 for later retrieval as described above with reference to step 614. If there is no violation, execution proceeds directly to step 620 and access of peripheral device 210 is permitted.

If no valid, matching license key 700 is found, then in the preferred embodiment, the operating system 206 displays a licensing violation message instructing the user to obtain a driver license key 700 in order to access the peripheral device 210 which requires a license, shown in step 614. Additionally, in step 614, the operating system 206 stores a record of the violation in the log file 118. This provides the manufacturer of the operating system 206 or the host system 102 a method for periodically checking for licensing violations by scanning the contents of the log file 118 with a log analysis tool. The peripheral device 210 may still be accessed by the customer as shown in step 620.

If, in decisional step 612, a valid, matching driver license key 700 is located in the keys file 208, then the process proceeds to decisional step 616. In decisional step 616, the operating system 206 sums up the amounts in the quantity fields of all the valid installed keys which license the class or group of peripheral devices 210 which includes the peripheral device 210 in question. If this total is less than the total number of peripheral devices 210 belonging to this class of peripheral devices 210 currently accessed by the system, then the operating system 206 displays a licensing violation message and logs the violation in the log file 218 for later retrieval as described above with reference to step 614.

It is contemplated to preclude access of the peripheral device 210 if a peripheral device 210 is attempted to be accessed without a corresponding license key 700 in the keys file 208. Thus, instead of proceeding to step 614 from decisional step 612 and 616, the "OPTIONAL NO" path can be chosen. In this case, the system would proceed to step 618, forcing the customer to obtain a license (and therefore a license key 700) before accessing the unlicensed peripheral device 210.

As a result of the present invention, peripheral device information which was previously required to be pre-defined within operating system software for a peripheral device to be recognized and used by the operating system software, is now obtained directly from the peripheral device media itself. Therefore, the operating system software no longer needs to be modified in order to communicate with, for example, a new capacity peripheral device. In addition to the elimination of the software work associated with the implementation of a new capacity peripheral device, the present invention removes the link between operating system software release levels and peripheral devices. This, in turn, allows customers to upgrade to new capacity peripheral devices without the necessity of changing operating system software release levels. Overall, the inventors believe that this will result in a decreased time to market for new capacity peripheral devices and an increased potential customer base. Also, internal users are now able to test new capacity peripheral devices without the need for a specially modified version of operating system software.

There is a significant additional advantage associated with obtaining a peripheral device's identification information from the peripheral device media itself. It involves using a peripheral device formatting program to make one peripheral device "look like" (or "masquerade as") a different peripheral device (with respect to capacity, alphanumeric display code, etc.). For example, this ability could be used to address the situation that occurs when a customer needs replacement XXX disk devices but the XXX disk device is no longer manufactured. In this case, available YYY disk devices could be made to "look like" XXX disk devices by using a disk formatting program to place the identification information (e.g., "DII") pertaining to disk XXX on disk YYY's media. Once this formatting step has been completed, the operating system (due to the presence of the invention software) would treat all reformatted YYY disks as if they were XXX disks.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A method of confirming whether or not a new peripheral memory device is format compatible with an existing computer system, comprising the steps of:
    a) adding said new peripheral memory device to said computer system without a software change to an operating system and without rebooting a new configuration;
    b) said computer system first determining that said peripheral memory device is not logically connected to the computer operating system operating in conjunction with said existing computer system;
    c) reading from said peripheral memory device a preformatted logical attribute information which has been predetermined and written into the memory device and includes formatted capacity and at least one of a vendor identification value and a product identification value for use in determining if said peripheral memory device is connectable to said operating system;
    d) determining if said operating system and the formatted capacity of said peripheral memory device are compatible based on said peripheral memory device logical attribute information obtained from said peripheral memory device;
    e) said step of determining further including steps of:
        1) determining the block size and total number of blocks of said memory device, wherein block size is the physical block size of said peripheral memory device;
        2) determining total physical space available in said peripheral memory device based on said determined block size and said determined total number of
        3) comparing said determined total physical space available with said peripheral memory device formatted capacity;
    f) logically connecting said now peripheral device to said computer operating system when it is determined that said operating system and the formatted capacity of said peripheral device are compatible; and
    g) disallowing communication with said peripheral memory device if said peripheral memory device capacity as indicated by said peripheral memory device logical attribute information exceeds said total physical space available.

2. The method according to claim 1, wherein said peripheral memory device logical attribute information which indicates said peripheral memory device capacity is written into said peripheral memory device and both said determined block size and said determined total number of blocks are stored in the form of micro code in said peripheral memory device.

3. The method of claim 1, wherein said peripheral device is one of a plurality of different peripheral devices, and each of said peripheral devices is capable of communicating with said computer system using a single peripheral device driver.

4. Apparatus for confirming whether or not a new peripheral memory device is compatible with an existing computer system, comprising:
    a) means for adding said new peripheral memory device to said computer without a software change to an operating system and without rebooting a new configuration;
    b) recognition means in said computer system for determining whether said new peripheral memory device has a formatted capacity that is not logically connectable to an operating system operating in conjunctions with said computer system;
    c) means for obtaining from said peripheral memory device a preformatted logical attribute information which has been predetermined and written into the memory device and includes formatted capacity and at least one of a vendor identification value and a product identification value for use in determining if said peripheral memory device is connectable to said operating system;

d) means for determining if said operating system and the formatted capacity of said peripheral memory device are compatible based on said peripheral memory device logical attribute information obtained from said peripheral memory device;
e) said means for determining further including:
  1) means for determining the block size and total number of blocks of said memory device, wherein block size is the physical block size of said peripheral memory device;
  2) means for determining total physical space available in said peripheral memory device based on said determined block size and said determined total number of blocks;
  3) means for comparing said determined total physical space available with said peripheral memory device formatted capacity;
f) means for logically connecting said new peripheral device to said computer operating system when it is determined that said operating system and the formatted capacity of said peripheral device are compatible; and
g) means for disallowing communication with said peripheral memory device if said peripheral memory device capacity as indicated by said peripheral memory device logical attribute information exceeds said total physical space available.

* * * * *